(12) United States Patent
Andersen et al.

(10) Patent No.: US 8,960,219 B2
(45) Date of Patent: Feb. 24, 2015

(54) VALVE ACTUATOR

(75) Inventors: Jens Christian Folkmar Andersen, Fredericia (DK); Karsten Schack Madsen, Odense C (DK); Kenneth Rehhoff, Odense C (DK); Louise Wichmann Agner, Kolding (DK)

(73) Assignee: Alfa Laval Corporate AB, Lund (SE)

( * ) Notice: Subject to any disclaimer, the term of this patent is extended or adjusted under 35 U.S.C. 154(b) by 585 days.

(21) Appl. No.: 13/132,963

(22) PCT Filed: Dec. 9, 2009

(86) PCT No.: PCT/DK2009/050326
§ 371 (c)(1),
(2), (4) Date: Jul. 26, 2011

(87) PCT Pub. No.: WO2010/066257
PCT Pub. Date: Jun. 17, 2010

(65) Prior Publication Data
US 2011/0272616 A1    Nov. 10, 2011

(30) Foreign Application Priority Data
Dec. 11, 2008  (DK) .................... 2008 01764

(51) Int. Cl.
*F16K 27/04*    (2006.01)
*F16K 31/122*   (2006.01)

(52) U.S. Cl.
CPC .................... *F16K 31/122* (2013.01)
USPC ........................ 137/270; 251/63.5

(58) Field of Classification Search
USPC ............. 251/337, 62, 48, 54, 63.5; 137/270, 137/271; 92/128, 164, 163
See application file for complete search history.

(56) References Cited

U.S. PATENT DOCUMENTS 3,226,078 A * 12/1965 Anderson ................ 251/62
4,563,941 A   1/1986 Soendergaard
(Continued)

FOREIGN PATENT DOCUMENTS

CN    2246740 Y    2/1997
CN    2918927 Y    7/2007
(Continued)

OTHER PUBLICATIONS

PCT/ISA/237 for Application No. PCT/DK2009/050326 dated Mar. 18, 2010.
(Continued)

*Primary Examiner* — John K Fristoe, Jr.
*Assistant Examiner* — Andrew J Rost
(74) *Attorney, Agent, or Firm* — Buchanan Ingersoll & Rooney P.C.

(57) ABSTRACT

Actuator for a seat valve or a butterfly valve which is of the type that is normally closed (NC) or normally open (NO), and also has a cylinder and a piston being held in the normal position by a spring. The spring includes a closed space with a pressurized fluid, and the actuator further has at least a top unit, with two or more connections for a pressurized fluid. The actuator is with one of the connections in the top unit that is connected to the inside of the cylinder through one or more openings at one end of the cylinder and another connection is connected to the inside of the cylinder through one or more openings at the other end of the cylinder. The top unit is designed to allow the connections to be interchanged by changing the position of the top unit, e.g. by turning the top unit 180 degrees around an axis corresponding to or parallel to the axis of the piston and cylinder.

19 Claims, 3 Drawing Sheets

(56) References Cited

U.S. PATENT DOCUMENTS

| | | | |
|---|---|---|---|
| 4,596,267 A * | 6/1986 | Tosseghini | 137/270 |
| 4,712,576 A * | 12/1987 | Ariizumi et al. | 137/270 |
| 5,279,325 A * | 1/1994 | Kaspers | 137/270 |
| 5,469,774 A * | 11/1995 | Kaspers | 137/270 |
| 5,853,022 A * | 12/1998 | Eggleston et al. | 91/54 |
| 6,783,107 B2 * | 8/2004 | Chatufale | 251/54 |
| 7,278,441 B2 * | 10/2007 | Tanikawa et al. | 137/270 |
| 2006/0169334 A1 | 8/2006 | Hayashi et al. | |

FOREIGN PATENT DOCUMENTS

| | | |
|---|---|---|
| EP | 0 195 490 | 9/1986 |
| EP | 495747 A2 | 7/1992 |
| JP | 01-247808 | 10/1989 |
| JP | 2002-161901 | 6/2002 |
| JP | 2005076731 A | 3/2005 |
| JP | 2008-002511 | 1/2008 |
| JP | 2008-144819 | 6/2008 |
| WO | WO2005095833 A1 | 10/2005 |

OTHER PUBLICATIONS

Office Action issued by Japan Patent Office on Feb. 19, 2013 in corresponding Japanese Patent Application No. 2011-539898.

Office Action (with Search Report) for Chinese Patent Application No. 200980150317.0 dated Oct. 8, 2012 with English translation.

* cited by examiner

VALVE ACTUATOR

FIELD OF THE INVENTION

The present invention relates to an actuator for example for activating a seat valve or a butterfly valve. The actuator is safe and easy to open or close, and the actuator is of the type that is normally closed (NC) or normally open (NO), and also contains a cylinder and a piston said piston being held in the normal position in the cylinder by a spring.

BACKGROUND OF THE INVENTION

In a number of industries it is very common to use valves to regulate the mixing of different ingredients or to regulate the flow in pipe systems by activating certain valves and thereby opening or closing the flow of the different mediums. For an example in a dairy plant it is common that the plant is equipped with a number of such valves and actuators. The valves are for instance used during cleaning of the pipes in the plant, during mixing and during filling of processed products into cartons.

When projecting the plant it is considered according to the different processes and according to relevant regulative whether to use a normally closed or a normally open valve. The difference of the two types of normal position is all in the actuator. After having projected the plant the actuators and/or valves are ordered from the supplier with the specified configuration. It is, however, possible to change an actuator from normally closed to normally open or vice versa. Such an operation is not easy and a number of parts in the actuator have to be either replaced or rearranged in another position. Thus, it is a time consuming job and further it is a job that demands skilled personnel as such actuators often is with preloaded mechanical springs, which are not easy to take apart and rebuild. Some types of actuators require not only a rebuild, but simply have to be changed into another actuator with the desired normal position.

OBJECT OF THE INVENTION

It is the object of the invention to present an actuator for a valve, where the actuator can be changed from one normal position to another normal position without the need for unplugging any connections such as pneumatic hoses and/or electrical wires from the actuator. Further, it is the object of the invention to provide an actuator which is modular build, and thus can be used for several different valves and demands.

DESCRIPTION OF THE INVENTION

As mentioned in the text above, this invention concerns an actuator for activating a valve to open or close, where the actuator is of the type that is normally closed (NC) or normally open (NO), where the actuator also contains a cylinder and a piston, said piston being held in the normal position in the cylinder by a spring. Said spring acting on the piston in the cylinder virtually consists of a closed space with a pressurised fluid, preferably compressed atmospheric air, the actuator further consists of at least a top unit, with two or more connections for a pressurised fluid. Using a spring of compressed air gives a very simple and robust solution. Such a spring can easily be changed from normally closed to normally open simply by changing the piston side on which the pressure acts.

The use of a spring consisting of a pressurised fluid has several advantages over the prior art with mechanical springs. One advantage is that the housing can be designed to the specific pressure in the cylinder. Another advantage is that the volume of the cylinder can be optimised to a minimum by coupling a number of actuators or cylinders in series. The added volume of the cylinders then has the function of the spring and can be maintained with a preselected pressure. Further, an actuator according to the invention requires less pressure and thus, there is a smaller demand for pressurised fluid, e.g. pneumatic pressure and a smaller compressor can be used. By using a smaller compressor energy can be saved.

By designing the actuator according to the invention in such a way that one of said connections for pressurised fluid in the top unit further is connected to the inside of said cylinder through one or more openings at one end of the cylinder and that another connection for pressurised fluid is connected to the inside of said cylinder through one or more openings at the other end of said cylinder, and where the top unit is with a design allowing the connections to be interchanged by changing the position of said top unit, e.g. by turning the top unit 180 degrees around an axis corresponding to or parallel to the axis of the piston and cylinder, a very simple and easy change from one normal position to another normal position can be made.

By rotating the top unit with all the pneumatic and electric connections about its own axis, there is no need to disconnect and reconnect any lines to or from the top unit as the lines can be installed with a small necessary over length. Thus, the change from one position to another is made in a quick, easy and foolproof way.

In a preferred embodiment of an actuator according to the invention the cylinder is provided with a hollow cylinder wall, constituting at least one, but preferably a number of internal fluid channels along the cylinder wall, where the internal channels near one end of the cylinder are open towards the inside of said cylinder and at the other end are in connection with a connection for pressurised fluid. Said connection for pressurised fluid is preferably supplied through the top unit. By having the fluid channels integrated in the cylinder wall a very elegant solution is obtained and further, the risk of external connections being damaged during cleaning and ordinary use is eliminated.

Such a cylinder part with hollow side walls can be moulded in a selected and preferred type of polymer, which even can be reinforced with fibres of any kind. The moulding process can be chosen from any known process, but preferably injection moulding can be used.

The side wall of the cylinder can be provided with one or with several internal channels, which can be evenly distributed along the circumference of the cylinder wall or more locally.

An actuator according to the invention is preferably provided with a cylinder which is closed at least at one end, where the outer end face of the cylinder is with at least two connections constituted by at least two holes, where the top unit is with corresponding holes and where sealing between the cylinders outer end face and the top unit is made with a static seal, e.g. an O-ring arranged around the holes. By using O-rings a very robust solution is obtained that is easy to service with standard O-rings. The cylinder end face can as mentioned be provided with two or more connections, at least one leading through the end face of the cylinder and at least another leading to the internal channels in the cylinder wall.

Another preferred embodiment of the actuator according to the invention is also provided with a cylinder that is closed at least at one end, but where the outer end face of the cylinder is provided with two connections constituted by two elongated recesses, where holes are arranged in the top unit to correspond with said recesses and where a sealing between the cylinder's outer end face and the top unit is accomplished by a static seal, e.g. an O-ring arranged around the elongated recesses. By having elongated recesses in the end face of the cylinder it is possible to make a change from normally open to normally closed or vice versa with only a small twist of the top unit. This embodiment can be more attractive for some applications, as the top unit can be moved between the two positions by loosening the top unit and twisting it. Thus, there is no need to dismantle the parts thereby making the change of the actuator even more simple.

To fixate the top unit of the actuator according to the invention, the outer end face of the cylinder can be provided with one or more symmetrically arranged threaded holes for fixing the top unit in a specific position, the top unit being provided with thru holes corresponding to the one or more threaded holes. This way it is possible to fixate the top unit in at least two different positions on the cylinder. Alternatively the top unit can be provided with one or more elongated holes, allowing the top unit to be rotated a certain angle according to the mentioned elongated recesses.

In yet another preferred embodiment of an actuator according to the invention the top unit is a modular unit and further contains one or more of the following components: magnetic indicator of piston position, light indication of piston position, solenoid for activating the piston. Said modular top unit can preferably be designed to be fitted with the above mentioned components according to specific demands in a top unit with an interface to the cylinder part.

The cylinder part is also preferably made as a modular part that can be fitted with e.g. different types of pistons and top units. An actuator for activating a valve according to the invention can at least consist of a modular cylinder unit, a modular top unit and a modular yoke unit. The yoke unit is the part forming the bottom of the cylinder and also connecting the actuator to the valve.

All the main parts for the actuator can preferably be made from a type of polymer by injection moulding or another suitable manufacturing process.

By building the actuator of modular units it is obtained that the number of different parts is optimised as many of the parts can be used for several different sizes and types of valves. This also reduces the need for spare parts as only a small number of different parts is used.

Another considerable advantage by using an actuator as described is that only a very few dynamic seals are necessary, increasing the actuator lifetime and facilitating its maintenance.

DESCRIPTION OF THE DRAWING

In the following the invention will be described with reference to the drawing, wherein.

DETAILED DESCRIPTION OF THE INVENTION

Figure 1:
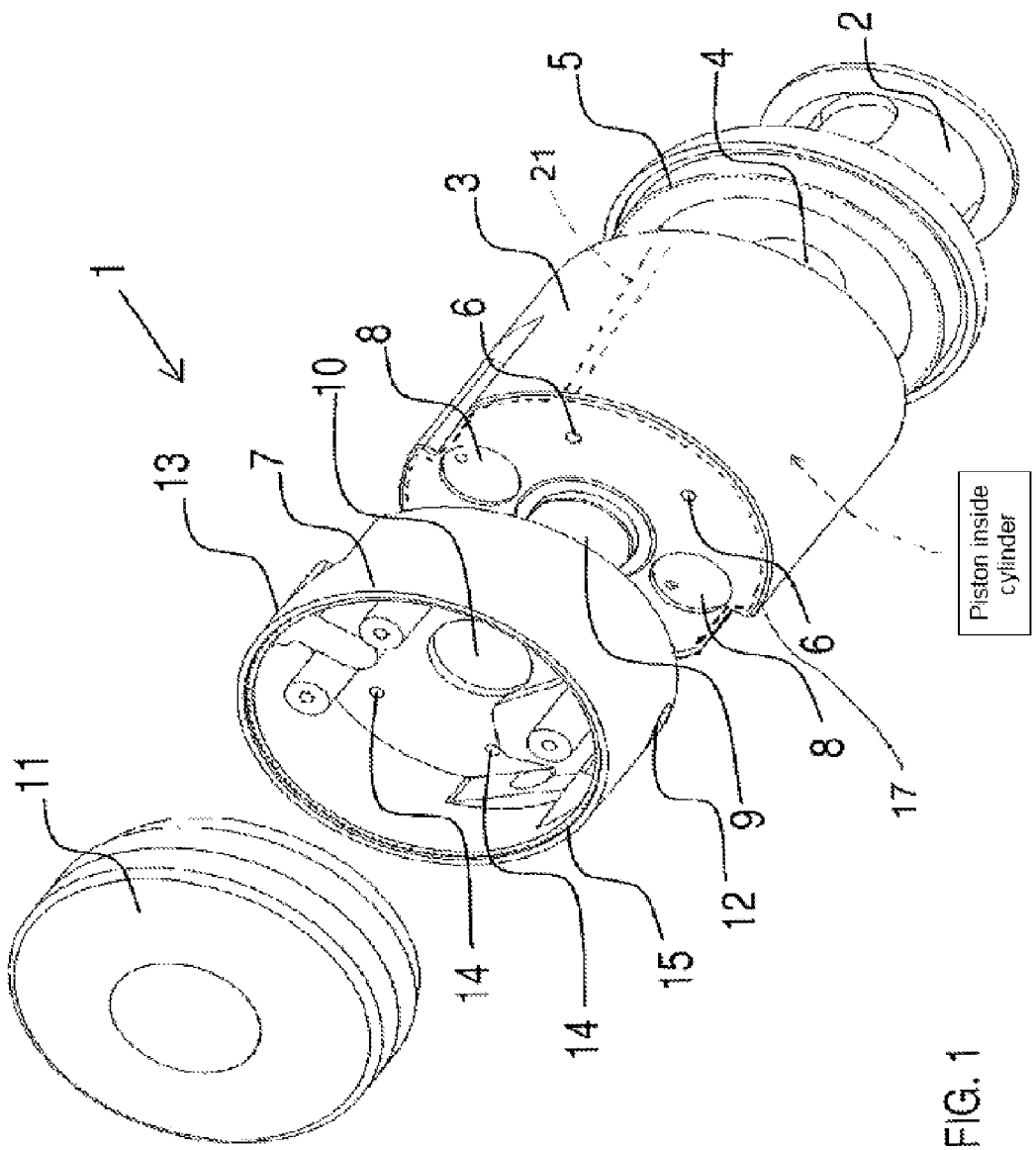
FIG. 1 shows an actuator in exploded view.

FIG. 1 shows an actuator 1 in exploded view. From the bottom end a yoke 2 for fastening the actuator 1 to a valve is seen. The yoke 2 also closes the bottom of a cylinder 3 and is fitted with a central hole 4 for the valve stem (not shown). Along the upper circumference of the yoke 2 a dotted line indicates a seal 5. At the top of the cylinder 3, two of the four symmetrically arranged threaded holes 6 for fixing a top unit 7 to the cylinder 3 are shown. Further, connections 8 to the inside of the cylinder 3 are shown as two circular recesses with a smaller hole in the recess. In the recess a sealing, not shown, of the O-ring type can be arranged. FIG. 1 schematically illustrates a static seal/O-ring 17 between the outer end face of the cylinder 3 and the top unit 7.

A projection 9 is arranged centrally at the top of the cylinder 3. This projection 9 has several functions. One function is to guide the top unit 7, while rotating it to alter the actuator 1 from one normal position to another normal position. As it can be seen the top unit 7 has a central hole 10 corresponding to the projection 9. Another function is to serve as a guide for a projection on the internal piston (not shown). Said projection on the piston can be provided with a magnet or some other type of element that can be detected by means of a detecting unit arranged in the top unit 7.

One of the connections 8 leads the pressure to the volume above the piston and the other connection 8 leads the pressure to the volume underneath the piston. The pressure to underneath the piston can be lead in external lines or preferably in channels (schematically identified by 21 in FIG. 1) incorporated into the cylinder wall.

By rotating the top unit 7 the actuator 1 is easily changed from e.g. normally open to normally closed. The only action required is to loosen a lid 11 and the top unit 7 and simply twist the top unit 7 180 degrees and fasten the top unit 7 and the lid 11 again. No disconnecting of any lines or wires is necessary.

The top unit 7 as shown in FIG. 1 has connections 12 and 13 for a pressurised fluid on the sidewall and with approximately a 180 degree distance. One connection 12 will typically be connected to a constant pressure and thus acting as an air spring keeping the piston in the normal position. The other connection 13 will typically be connected to an activating pressure controlled by e.g. a solenoid. By activation of the actuator 1 the piston is driven to its "not" normal position by the activating pressure, which is capable of overcoming the air spring pressure and thus opens or closes the valve.

Inside the top unit 7 a number of elements can be located, e.g. a solenoid for activating the actuator 1, a detecting unit for determining the position of the piston, a light emitting diode for visual indication of the valve status. That is, the top unit is a modular unit that may further contain one or more of the following components: magnetic indicator of piston position (schematically identified by 20 in FIG. 2), light indication of piston position (schematically identified by 22 in FIG. 2), solenoid for activating the piston (schematically identified by 24 in FIG. 2). Two out of four holes 14 for fastening of the top unit 7 to the cylinder 3 are also seen inside the top unit 7. At the upper circumference of the top unit 7 a dotted line 15 indicates a sealing between the top unit 7 and the lid 11.

Figure 2:
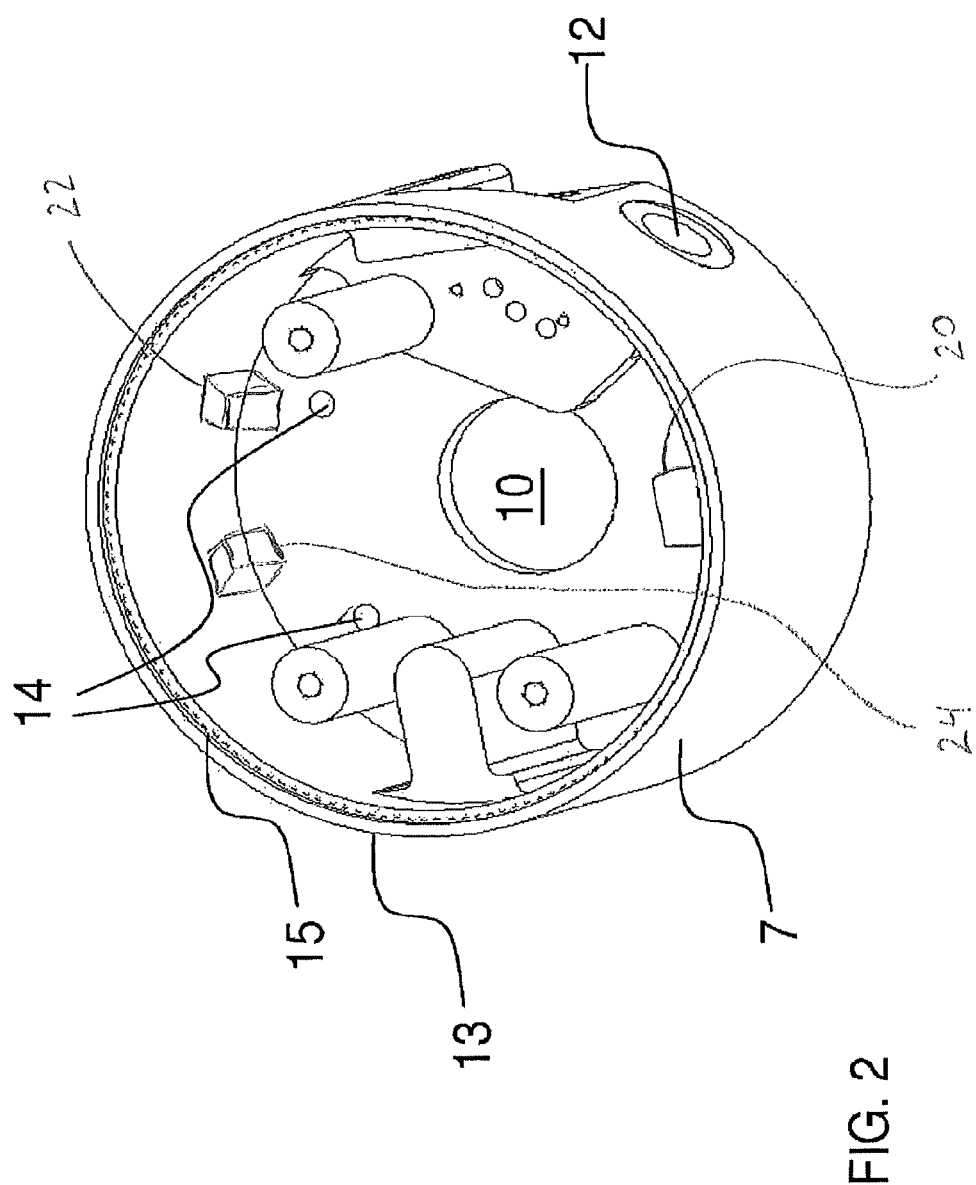
FIG. 2 shows a top unit.

In FIG. 2 only the top unit 7 is seen, here in larger detail, but only with features already described in the above text.

Figure 3:
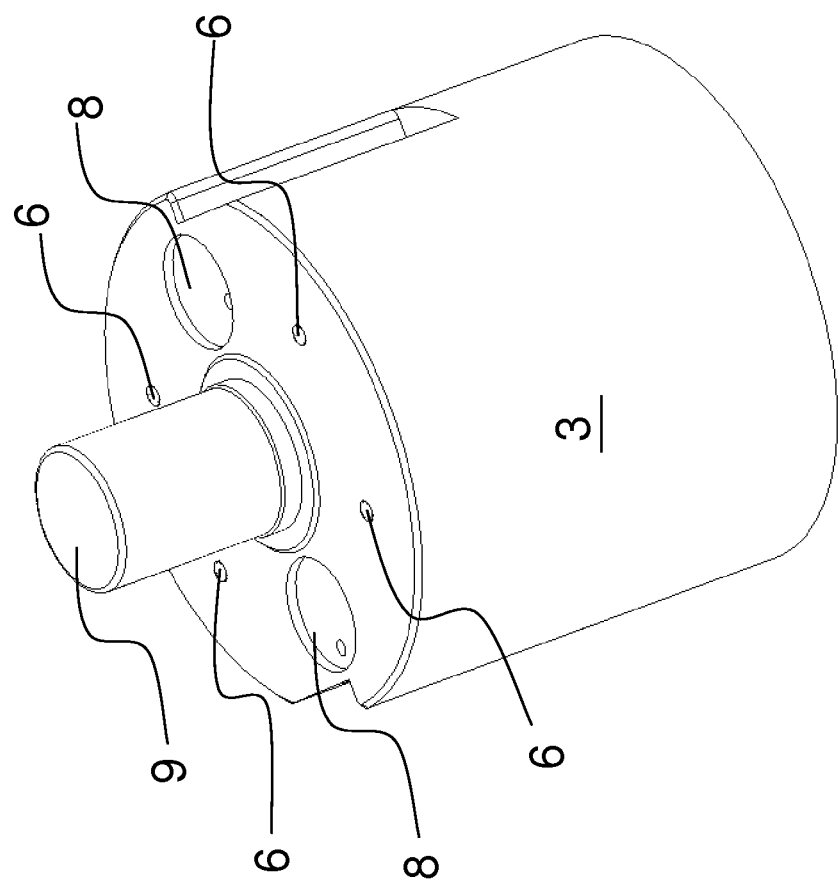
FIG. 3 shows a cylinder.

In FIG. 3 the cylinder 3 is seen. At the top of the cylinder 3 the two connections 8 for the pressurised fluid are seen as recesses with small holes to the inside of the cylinder 3. Further, four threaded holes 6 for fastening the top unit 7 to the cylinder are seen.

The yoke 2, the cylinder 3, the top unit 7 and the lid 11 can be made by injection moulding in one or more suitable materials e.g. a fibre reinforced polymer. By using such materials a high quality product can be manufactured at a very favourable and competitive price.

The invention is not limited to the embodiments described above and shown on the drawings, but can be supplemented and modified in any manner within the scope of the invention as defined by the enclosed claims.

The invention claimed is:

1. Actuator for activating opening or closing of a valve, where the actuator is of a type that is normally closed or normally open, and also contains a cylinder and a piston,
said piston being held in the normal position in the cylinder by a spring,
wherein said spring acting on the piston in the cylinder consists of a closed space with a pressurised fluid,
the actuator further comprises at least one top unit with two or more connections for the pressurised fluid, the top unit being rotatably mounted on the cylinder, one of said connections for pressurised fluid in the top unit is connected to the closed space inside said cylinder through an opening of the cylinder and another of said connections for pressurised fluid in the top unit is connected to the closed space inside said cylinder through another opening of said cylinder,
the top unit being configured to rotate relative to the cylinder to change a position of the top unit relative to the cylinder to allow the connections to be interchanged.

2. Actuator for activating a valve according to claim 1, wherein the cylinder includes a cylinder wall and a plurality of internal fluid channels along the cylinder wall, where the internal channels near one end of the cylinder are open to the inside of said cylinder and at the other end are in connection with a connection for pressurised fluid.

3. Actuator for activating a valve according to claim 1, wherein the cylinder is closed at least at one end, an outer end face of the cylinder is provided with at least two holes, where the top unit is provided with corresponding holes and where sealing between the cylinder's outer end face and the top unit is accomplished with a static seal arranged around the holes.

4. Actuator for activating a valve according to claim 3, wherein the static seal is an O-ring arranged around the holes.

5. Actuator for activating a valve according to claim 1, wherein the cylinder is closed at least at one end, an outer end face of the cylinder is provided with two elongated recesses, where the top unit is provided with holes arranged to correspond to said recesses and where sealing between the cylinders outer end face and the top unit is accomplished with a static seal arranged around the elongated recesses.

6. Actuator for activating a valve according to any one of claim 3 and claim 5, wherein the outer end face of the cylinder is provided with one or more symmetrically arranged threaded holes for fixing the top unit in a specific position relative to the cylinder, the top unit being provided with thru holes corresponding to the one or more threaded holes.

7. Actuator for activating a valve according to any one of claim 3 and claim 5, wherein the outer end face of the cylinder is provided with one or more threaded holes for fixing the top unit in a specific position relative to the cylinder and the top unit is provided with one or more elongated holes, allowing the top unit to be rotated a certain angle.

8. Actuator for activating a valve according to claim 5, wherein the static seal is an O-ring arranged around the holes.

9. Actuator for activating a valve according to claim 1, wherein the top unit is a modular unit and further contains one or more of the following components: magnetic indicator of piston position, light indication of piston position, solenoid for activating the piston.

10. Actuator for activating a valve according to claim 1, wherein the actuator at least consists of a modular cylinder unit, a modular top unit and a modular yoke unit.

11. An actuator for activating opening and closing of a valve, and switchable between normally open and normally closed, the actuator comprising:
a cylinder;
a piston located in the cylinder;
at least one top unit movably mounted on the cylinder to change a position of the top unit relative to the cylinder, the top unit including at least two connections for a pressurized fluid, the at least two connections including a first connection and a second connection;
a spring comprising a closed space containing a pressurized fluid acting on the piston in the cylinder to hold the piston in a normally closed position or a normally open position;
the top unit being movable relative to the cylinder to position the top unit in a first position relative to the cylinder in which the first connection in the top unit is connected to a first portion of the cylinder on one side of the piston through a first opening of the cylinder and the second connection is connected to a second portion of the cylinder on an opposite side of the piston through a second opening of the cylinder so that the actuator is normally open; and
the top unit being movable relative to the cylinder to position the top unit in a second position relative to the cylinder in which the second connection in the top unit is connected to a first portion of the cylinder through the first opening of the cylinder and the first connection is connected to the second portion of the cylinder through the second opening of the cylinder so that the actuator is normally closed.

12. The actuator for activating a valve according to claim 11, further comprising a static seal between the cylinder and the top unit.

13. The actuator for activating a valve according to claim 11, wherein an outer end face of the cylinder includes a plurality of symmetrically arranged threaded holes for fixing the top unit in a specific position relative to the cylinder, the top unit including thru holes positionally corresponding to the threaded holes in the outer end face of the cylinder.

14. The actuator for activating a valve according to claim 11, wherein an outer end face of the cylinder includes a plurality of threaded holes for fixing the top unit in a specific position relative to the cylinder, the top unit including thru holes positionally corresponding to the threaded holes in the outer end face of the cylinder.

15. The actuator for activating a valve according to claim 11, wherein the top unit contains at least one of: a magnetic indicator of piston position, a light indication of piston position and a solenoid for activating the piston.

16. The actuator for activating a valve according to claim 11, further comprising an O-ring seal between the cylinder and the top unit.

17. An actuator for activating opening or closing of a valve, where the actuator is of a type that is normally closed or normally open, the actuator comprising:
a cylinder in which is positioned a piston, the piston being held in the normal position in the cylinder by a spring;
the spring acting on the piston in the cylinder consists of a closed space with a pressurised fluid;
at least one top unit with at least two connections for the pressurised fluid, one of the connections for pressurised fluid in the top unit being connected to a first portion of the closed space inside the cylinder through an opening of the cylinder and the other of the connections for pressurised fluid in the top unit being connected to a second portion of the closed space inside the cylinder through another opening of the cylinder, the first portion of the closed space inside the cylinder being positioned on one side of the piston and the second portion of the closed space inside the cylinder being positioned on an opposite side of the piston; and the top unit being rotatably mounted on the cylinder and configured to rotate relative to the cylinder to change a position of the top unit relative to the cylinder and allow the connection between the connections and the first and second portions to be interchanged.

18. The actuator for activating a valve according to claim 17, further comprising a static seal between the cylinder and the top unit.

19. The actuator for activating a valve according to claim 17, wherein an outer end face of the cylinder includes a plurality of symmetrically arranged threaded holes for fixing the top unit in a specific position relative to the cylinder, the top unit including thru holes positionally corresponding to the threaded holes in the outer end face of the cylinder.

\* \* \* \* \*